Patented Mar. 28, 1939

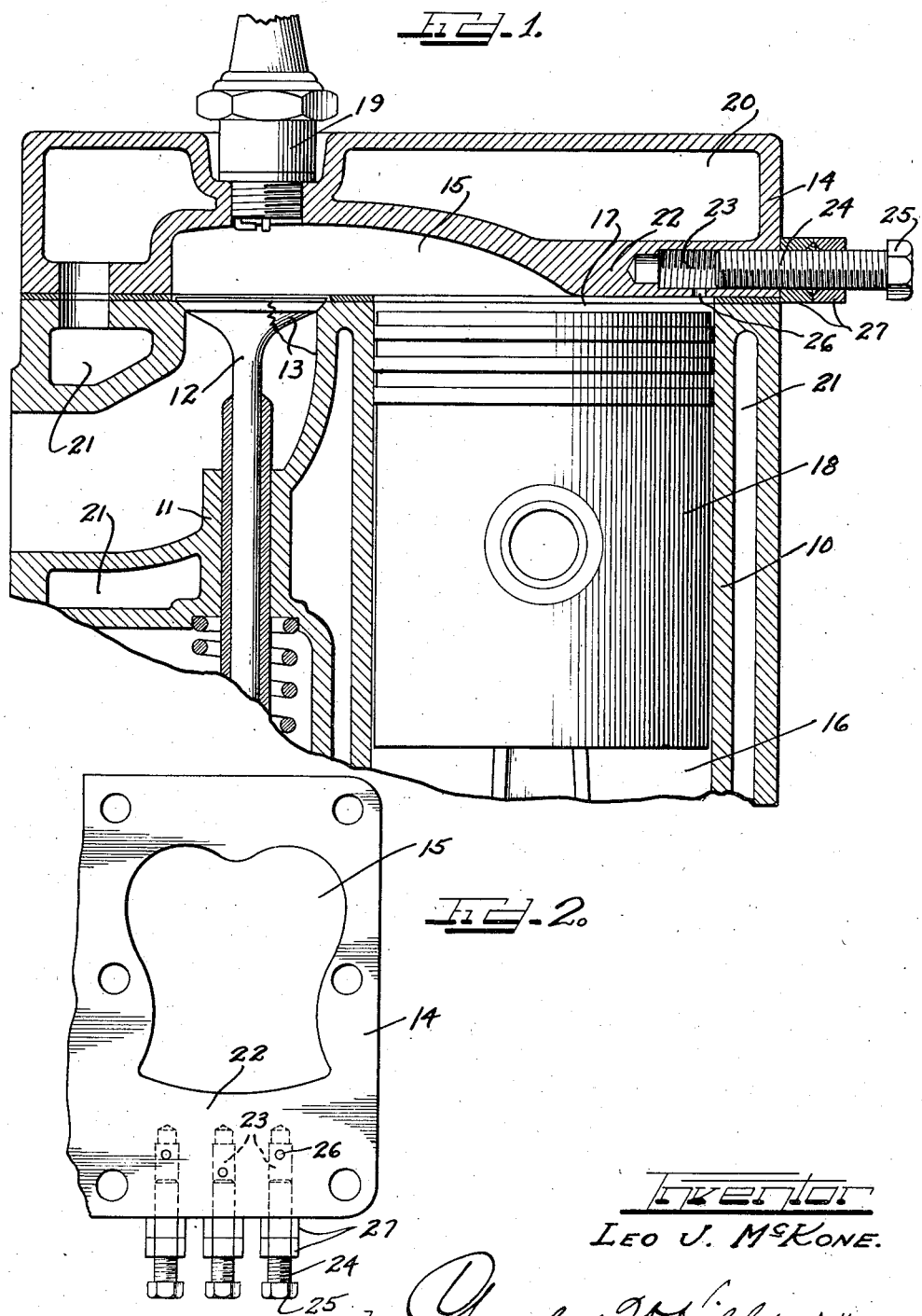

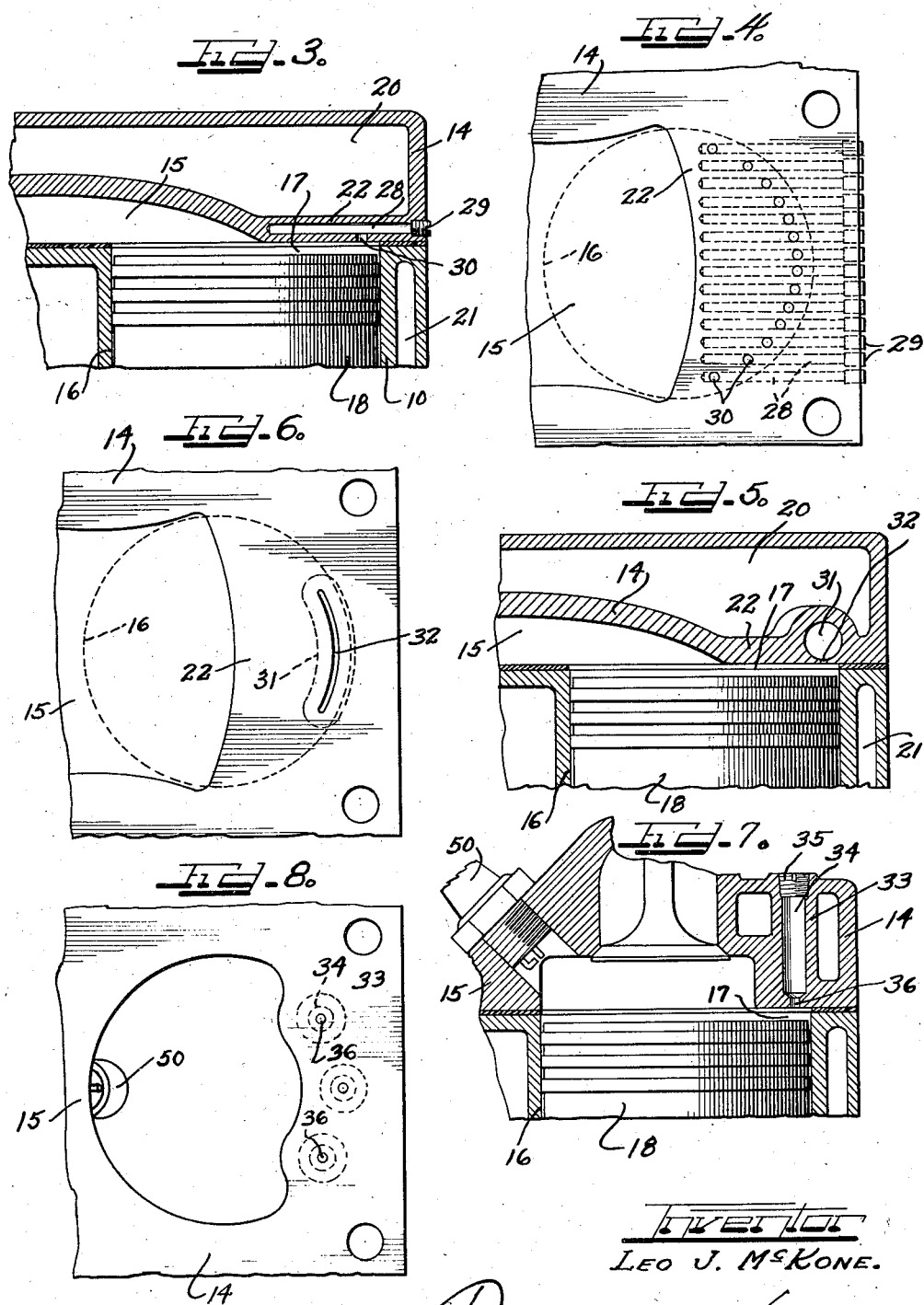

2,151,927

UNITED STATES PATENT OFFICE 2,151,927

INTERNAL COMBUSTION ENGINE

Leo J. McKone, Chicago, Ill., assignor of one-third to Kenneth E. Lyman, Chicago, Ill., and one-third to Dean D. Francis, Cleveland, Ohio Application July 14, 1937, Serial No. 153,477

4 Claims. (Cl. 123—191)

My invention relates to internal combustion engines and particularly to an improved cylinder head construction for preventing "knocking" in the engine.

It has heretofore been proposed, as in the Martin Patent No. 2,010,028, to overcome detonation in high compression engines by providing a secondary combustion chamber. A secondary combustion chamber, such as in the Martin construction, obviously introduces structural and operating complications.

I have now found that if, instead of providing a secondary combustion chamber, a dead gas pocket of relatively very small volume is formed in the cylinder head, particularly on the side of the cylinder away from the spark ignition means, detonation may be very effectively prevented without loss of power. Practically no burning takes place in such a pocket owing to the high percentage of waste gases that builds up in the pocket as a result of the small size of the entrance into said pocket from the combustion chamber space. Consequently, the pocket serves more as a cushioning means for the ignited charge, preventing the portion of the charge last to be ignited from being compressed so rapidly and severely as to detonate.

In accordance with my invention, the dead gas pocket, or pockets, is positioned in the underside of the cylinder head at a point farthest from the spark ignition means and above a cylinder, where the clearance between the under surface of the head and the piston, when at the top of its stroke, is very little. It is this clearance space that contains the portion of the fuel charge last to be ignited. By providing a localized cushioning effect for that portion of the charge, I find that "knocking" is completely eliminated without appreciable loss in the high compression ratio being employed or in power output.

It is therefore an important object of this invention to provide an internal combustion engine of the spark ignition type wherein the head is provided with relatively small dead gas pockets serving to cushion the compression action of ignition upon the part of the charge last to be ignited and hence prevent detonation thereof.

Other and further important objects of this invention will be apparent from the disclosures in the specification and the accompanying drawings.

This invention (in a preferred form) is illustrated in the drawings and hereinafter more fully described.

On the drawings:

Figure 1 is a vertical diametral section of the upper end of a cylinder structure with reserve gas pockets or cells provided in the cylinder head above the clearance space between the head and piston.

Figure 2 is an underside view of the cylinder head.

Figure 3 is a vertical section of the upper end of a cylinder structure showing a modified arrangement of reserve gas pockets.

Figure 4 is an underside view of the cylinder head shown in Figure 3.

Figure 5 is a vertical diametral section of the upper end of a cylinder structure showing another modified arrangement of gas reserve space.

Figure 6 is an underside view of the cylinder head of Figure 5.

Figure 7 is a vertical diametral section of the upper end of a valve-in-head cylinder structure showing a further modified arrangement of reserve gas pockets.

Figure 8 is an underside view of the cylinder head of the structure of Figure 7.

As shown on the drawings:

Referring to Figure 1, the engine block 10 provides valve guide brackets 11 for intake and exhaust valves 12 and 13 respectively. The cylinder head 14 has the main firing chamber or recess 15 communicating with the inlet and exhaust ports and partially overhanging the upper end of the cylinder bore 16; the substantially flat portion of the head defining the clearance recess 17 when the piston 18 is at the top of its stroke. A spark plug 19 extends into the main ignition chamber 15 on the side nearest the intake and exhaust ports. The cylinder head is hollow to provide a water space 20, and the usual water spaces 21 are provided around the cylinder wall and the gas inlet and outlet.

In the cylinder head wall portion 22 above the clearance space 17, I provide dead pockets or chambers 23 (Figures 1 and 2) which may be in the form of drill holes closed at their outer ends as by means of plugs. In the arrangement of Figures 1 and 2, the closure means are in the form of threaded stems having heads 25 by means of which they may be threaded into or out of the threaded drill holes or bores 23 so as to increase or decrease the gas volume capacity of the pockets. Each of the pockets is connected by a comparatively small passage or port 26 with the clearance space 17, and these ports are preferably close to the cylinder wall. Lock nuts 27 may be provided on the threaded plugs or stems 24 to lock them in adjusted position.

During outstroke of the piston, gas is taken in, and during instroke of the piston, this gas is compressed in the main combustion chamber 15 and a very minor proportion of gas also flows through the ports 26 to the pockets 23 for compression therein, the comparatively thin clearance space 17 being left after the piston reaches the inner end of its stroke. The spark plug will now ignite the gas in the main chamber 15 and as the combustion of the gas progresses toward the clearance space 17 the unignited gas in said clearance space is further compressed into said pockets 23 to provide gas cushions. As the piston is moved outwardly, the gas held in the pockets 23 will partly flow out through the ports 26 into the cylinder in the wake of the piston.

The wall portion 22 of the cylinder head is made as thin as feasible, the thickness thereof being just sufficient for boring of the pockets 23 and to leave thin wall portions between the pockets and the cooling water space so that the gas in the pockets may be rapidly and efficiently cooled after compression into the pockets. Then when the piston starts its outstroke, this cool reserve gas will flow into the space between the wall portion 22 and the piston to reduce the chances for the formation of overheated gas volumes, which might explode at the wrong time and cause knocking. The arrangement will produce substantially uniform combustion progress from the spark plug through the main combustion space 15 and down through the cylinder and the drive effect against the piston will therefore be more uniform and effective, and knocking will be substantially eliminated.

In designing the gas pockets 23, I have found that the total volume of such pockets, relative to the volume of the combustion chamber, should be very small. For instance, in an engine having a compression ratio of, say, 7 to 1 or 8.7 to 1, the proportion of the volume of the pockets 23 to the volume of the flame swept area of the cylinder might be between 1 to 100 and 1 to 10,000, with a satisfactory ratio of 1 to 1500. The term "flame swept area of the cylinder" includes the combustion space provided by the cylinder head plus that volume of the cylinder exposed to combustion when the piston is at the lowest point of its travel.

By way of example, in an engine of 8.69 compression ratio, the bores of the pockets 23 may be 0.204" diameter and the total operative length of such bores ¾". If the cylinder is 3⅜" in diameter, the stroke is 4¼" and the volume of the chamber 15 is 81 c. c., the ratio of the volume of the gas pockets 23 to the total volume of the flame swept area of the cylinder is about 1 to 1600. Increasing the volume of the pockets as much as three times, by withdrawing the plugs 24 until the bores 23 are each ¾" in length, does not give any appreciably different effect as regards the prevention of knock nor is there any noticeable loss in power output. The spark can be advanced as much as 4° beyond normal, i. e. top dead center of the piston stroke, without knock.

Where the clearance space, such as that indicated by the reference numeral 17, in any particular engine is greater than here shown, the volume of the dead gas space 23 should be correspondingly greater.

In the modified arrangement shown by Figures 3 and 4, the cylinder head wall portion 23 above the clearance space 17 is bored or drilled along parallel lines and close together to form the reserve gas pockets or spaces 28 closed at their outer ends by threaded plugs 29 and each connected by a port 30 with the clearance space 17, the ports being preferably close to the cylinder wall. By having these pockets close together and extending the full width of the clearance space 17, and by having the wall portions above and below the pockets comparatively thin, the cooling water within the water space 20 will efficiently cool the gases compressed into the clearance space 17 and into the reserve pockets.

In the modified arrangement shown by Figures 5 and 6, the cylinder head wall portion 22 above the clearance space 17 is cored in casting to provide a cylindrical reserve chamber or pocket 31 close to and extending parallel with the cylinder wall. This pocket is connected by an elongated port 32 with the clearance space 17. Said port may be formed during the machining of the underside of the cylinder head.

In the modified arrangement of Figures 7 and 8, a valve-in-head type of engine is shown. The cylinder head 14 has cylindrical wall portions 33 extending between its upper wall and the bottom wall portion 22 above the clearance space 17, these cylindrical wall portions being bored or drilled to provide the reserve gas pockets or chambers 34 closed at their outer ends by threaded plugs 35 and communicating at their lower ends through ports 36 with the clearance space 17, the wall portions being located so that the ports 36 will be close to the cylinder wall. In this valve-in-head type of construction, the spark plug 50 is positioned diametrically opposite the ports 36, or substantially so.

The operation of the modified structures shown in Figures 3 to 8 inclusive will be the same as the operation described in connection with the structure shown on Figures 1 and 2.

I thus provide improved arrangements of dead gas pockets which will so cushion the compression and modify the combustion progress of the gases that more efficient piston drive will be accomplished without the occurrence of knocking. Although I have shown practical embodiments of my invention, I do not desire to be limited to the exact construction and arrangement shown, as changes and modifications may be made which would still come within the scope and spirit of the invention.

I claim as follows:

1. In an internal combustion engine including a cylinder, a head therefor providing an ignition recess in its underside and a piston operable in the bore of said cylinder, there being a small clearance space between the underside of said head and the piston at the top of its instroke, means for reducing the tendency of fuel to knock in said engine comprising a dead gas pocket formed in said head and opening into said clearance space, the volume of said pocket being less than $\frac{1}{100}$ of the volume of the flame swept combustion chamber of said engine.

2. In an internal combustion engine including a cylinder, a head therefor providing an ignition recess in its underside and a piston operable in the bore of said cylinder, there being a small clearance space between the underside of said head and the piston at the top of its instroke, means for reducing the tendency of fuel to knock in said engine comprising a dead gas pocket formed in said head and opening downwardly into said clearance space, the volume of said pocket being between $\frac{1}{100}$ and $\frac{1}{10000}$ of the volume of the flame swept combustion chamber of said engine.

3. In an internal combustion engine including a cylinder, a head therefor providing an ignition recess in its underside, ignition means in said recess and a piston operable in the bore of said cylinder, there being a small clearance space at a point most remote from said ignition means between the underside of said head and the piston at the top of its instroke, means for reducing the tendency of fuel to knock in said engine comprising a dead gas pocket formed in said head and opening into said clearance space, the volume of said pocket being of the order of magnitude of $\frac{1}{1500}$ of the volume of the flame swept combustion chamber of said engine.

4. In an internal combustion engine including a cylinder, a head therefor providing an ignition recess in its underside, a piston operable in the bore of said cylinder, there being a small clearance space between the underside of said head and the piston at the top of its instroke, and means for reducing the tendency of fuel to knock in said engine comprising a dead gas pocket formed in said head and opening into said cylinder, the improvement comprising positioning the means for communication between said dead gas pocket and said cylinder so that said dead gas pocket opens into said small clearance space.

LEO J. McKONE.